United States Patent [19]
LeBlanc

[11] Patent Number: 5,123,452
[45] Date of Patent: Jun. 23, 1992

[54] FLOW CONSTRICTION DEVICE FOR REMOVAL OF CONDENSATE

[76] Inventor: Thomas F. LeBlanc, 156 Park St., Gardner, Mass. 01440

[21] Appl. No.: 618,518

[22] Filed: Nov. 21, 1990

Related U.S. Application Data

[63] Continuation of Ser. No. 242,527, Sep. 12, 1988, abandoned.

[51] Int. Cl.⁵ ............................................. F15D 1/02
[52] U.S. Cl. ............................. 138/44; 138/41; 55/466
[58] Field of Search .................. 138/40, 41, 44, 45; 55/466; 137/177

[56] References Cited

U.S. PATENT DOCUMENTS

| | | | |
|---|---|---|---|
| 195,872 | 1/1820 | Ecremeuse | 138/44 |
| 816,280 | 3/1906 | Tuttle | 138/44 |
| 2,190,357 | 2/1940 | Ginter | 138/44 |
| 2,288,715 | 7/1942 | Karrer et al. | 138/41 |
| 2,501,593 | 3/1950 | Becker | 138/44 |
| 2,631,659 | 3/1953 | Wright | 138/44 |
| 2,662,541 | 12/1953 | Noon | 138/44 |
| 2,795,931 | 6/1957 | Le Foll | 138/44 |
| 3,311,131 | 3/1967 | Zahuranec | 138/44 |
| 3,894,562 | 7/1975 | Moseley et al. | 138/44 |
| 4,105,721 | 8/1978 | Schliebe | 138/44 |
| 4,171,209 | 10/1979 | Brown | 138/41 |
| 4,426,213 | 1/1984 | Stavropoulos | 138/44 |
| 4,526,593 | 7/1985 | Meyerson | 138/44 |
| 4,745,943 | 5/1988 | Mortensen | 138/44 |

FOREIGN PATENT DOCUMENTS 27062 of 1905 United Kingdom ................. 138/44

*Primary Examiner*—James E. Bryant, III
*Attorney, Agent, or Firm*—Wolf, Greenfield & Sacks

[57] ABSTRACT

A flow constriction device for the complete removal of condensate from steam and compressed air lines and steam-using equipment. This device incorporates the insertion of a uniquely designed convergent/divergent nozzle into a body piece. The body piece is installed within the piping system using existing means. The nozzle is protected from blockage with a screen secured at the inlet of the body piece. The dimensions of the convergent/divergent flow channel are determined for each application taking into account factors of pressure differential and the flow rate of the condensate to be removed. The design of the assembly allows for easy interchanging of the nozzle piece to meet changes in system conditions. The body of the device can be re-used, and the nozzle piece can be changed without disturbing the in-line screen element.

8 Claims, 3 Drawing Sheets

FLOW CONSTRICTION DEVICE FOR REMOVAL OF CONDENSATE

This application is a continuation of application Ser. No. 07/242,527, filed Sep. 12, 1988, now abandoned.

BACKGROUND OF THE INVENTION

This invention relates to devices for removing condensed liquids from a piping system or equipment while preventing or minimizing the loss of gases or vapors from which they have condensed.

Such devices are widely employed in steam systems for a variety of reasons. These include preventing mechanical damage caused by the shock of water hammer, maintaining the efficiency of heat transfer equipment, reducing the corrosive damage to piping and equipment and maintaining a more efficient system by minimizing the loss of live steam before its heat value can be properly utilized.

Similar devices are also used in compressed air systems to remove condensed water vapor. The reasons for their use are also similar to those for the steam systems, namely, to protect piping and equipment from mechanical shock and corrosion, and to minimize the loss of compressed air before its energy is utilized.

The broad category of prior art devices includes those which cycle between open and closed to remove the intended liquids and those which are designed with a fixed opening to constantly bleed the system. This invention relates to the latter group of fixed opening constant bleed devices. When using a fixed opening, constant bleed device, it is important to engineer the proper size opening for the existing system conditions for each application. If the conditions change, it may become necessary to change the size of the fixed opening.

U S Pat. Nos. 3,715,870 and 3,877,895 describe devices utilizing a plate with a small diameter orifice drilled at its center serving as a restricted flowpath for condensate to be forced through. The plate is inserted in a condensate return line between two flanges and sealed with gaskets. A screening device is incorporated into the gasket at the high pressure inlet side of the plate. These devices provide an efficient condensate bleed when properly sized to line conditions. They have the potential to develop leaks upon deterioration or improper installation of the gasket material. New gaskets are required when changing orifice plates in these assemblies. Flow patterns through them follow those of square-edged orifices. These flow patterns cause edge erosion of the orifice plate and often cause particle build-up at the exit of the orifice plate which can plug the orifice from the back side.

U.S. Pat. No. 4,171,209 describes an orifice plate formed within the body of a fitting which can be connected to standard pipe fittings in a condensate return line. This device incorporates a seated screening device spaced just upstream of the orifice plate formation. In its simplest form, the design of the device eliminates the sealing requirements between the orifice plate and the flanges in the device of the aforementioned patents. In order to prevent the loss of live steam, the inventor states in his preferred embodiments "the apparatuses according to the invention are best designed to have orifices of such size that most but not all of the condensate will be expelled therethrough so that at least some liquid remains within the system at the orifice to prevent loss of steam or other vapor or gas through the orifice." The entire unit must be changed when changes in system conditions warrant a different size orifice plate formation. Flow patterns through these devices also follow those of square-edged orifices. The drawbacks to flow through these devices are the same as those mentioned above.

U.S. Pat. Nos. 4,426,213 and 4,486,208 describe flow constriction devices for drainage of steam condensate, which incorpate the flow characteristics of a tubular nozzle. The bodies of these devices ar designed to receive tubular nozzle inserts in a variety of sizes. This design allows for easier less costly fabrication of the nozzle structure. It also makes possible the interchanging of nozzle structures within the same body when required to meet changes in system condition, e.g., steam pressure. However, due to the design of the apparatus, it is necessary to remove the in-line screening device to gain access to the nozzle structure when replacing it. Also, because the nozzle structures are frictionally mounted within the bore of the body, good seals are not maintained when the nozzle structure is changed. Although the inventor states that the tubular nozzle structure is removably inserted within the bore, it is advisable to replace the whole unit to ensure proper sealing at the point of frictional mounting when changing nozzles within a steam system. In the preferred embodiments of these devices, the cylindrical body piece is milled at 180° intervals to form two seats for engagement by a wrench. Installation and removal can be difficult in areas with limited acces due to the limited wrench engagement surfaces. Furthermore, the cylindrical shape of the body makes it difficult to recognize at a distance as that of a trapping device. Moreover, it also readily accepts pipe insulation and therefore is more likely to be insulated over and hidden from view than a non cylindrical shape.

SUMMARY OF THE INVENTION

This invention provides an assembly with a changeable convergent/divergent nozzle structure to remove condensate from steam and compressed air systems. The nozzle insert is easily removable and a replacement can be installed without disturbing the in-line screen element incorporated into the assembly. In fact, it is possible to change the nozzle insert by disconnecting only the outlet connection to the assembly, thus, saving time and permitting reuse of the rest of the assembly. A sure seal of mating surfaces upon changing nozzle inserts is attained by existing thread sealing techniques or by the use of an optional gasket piece. The flow channel of the nozzle insert is designed with a multistaged, turbulence-producing, converging inlet and a gradually-tapered turbulence-reducing, diverging outlet. The body of the device has large surfaces for wrench engagement at convenient intervals to facilitate installation within a piping system and to make the unit easily identifiable as a trapping device.

DESCRIPTION OF THE PREFERRED EMBODIMENTS

Figure 1A:
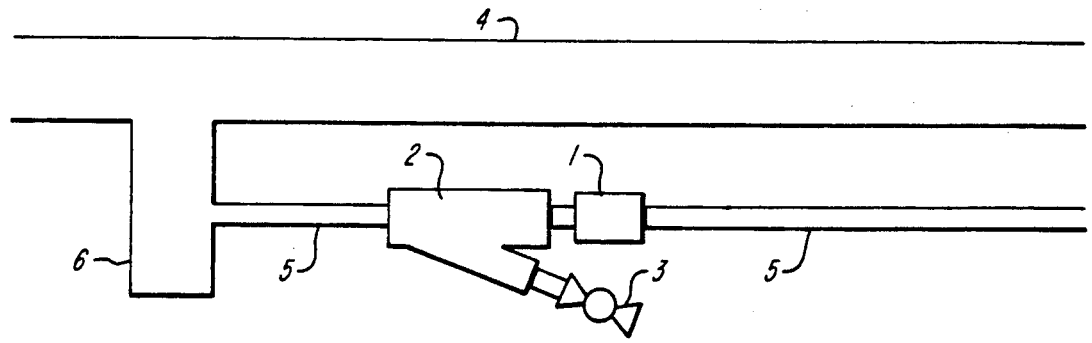
FIG. 1a illustrates a typical piping system to remove condensate from a steam line with the flow constriction device of this invention, as shown in FIGS. 1b and 2, piped in-line and just downstream of a Y-strainer with a blow-down valve.

FIG. 1a shows a piping arrangement for condensate removal within a steam system. The steam line 4 typically distributes steam to heating equipment in a plant or building. Condensate forms within the steam line 4 on a continuous basis when the steam exists at a saturated state. The rate of formation of this condensate can be calculated using data on the piping system and surrounding climate. The condensate formed settles to the bottom of the pipe 4 due to the force of gravity. This condensate is carried along by the flow of faster moving steam above and also by the customary gradual downward pitch of the pipe 4. Collection points called mud legs 6 are normally installed at intervals in the piping system to collect the condensate that has formed in the section of pipe. Sediments such as pipe scale also usually collect at the mud legs 6. A smaller line 5 is piped off of the mud leg 6 below the steam line 4, and the line 5 draws off the condensate that collects in the mud leg. A flow constriction device 1 is installed in the line 5 downstream of a protective Y-strainer 2. When condensate is removed continuously as it forms, a steady stream of condensate flows through the line 5 towards the Y-strainer 2 and flow constriction device 1. The Y-strainer 2 filters any sediments that failed to settle in the mud leg 6 which could adversely affect flow through the constriction device 1, and particularly its nozzle 9 shown in FIG. 1b. A valve 3 is also installed on the Y-strainer 2 to periodically remove sediments which the Y-strainer 2 collects. The condensate return line 5 connects directly to the outlet of the flow constriction device 1 and usually returns the condensate to the boiler for reuse.

FIG. 1a allows typical piping for a drip leg on a steam distribution line. Similar principals are used for piping which drains condensate from steam using equipment and compressed air systems.

Figure 1B:
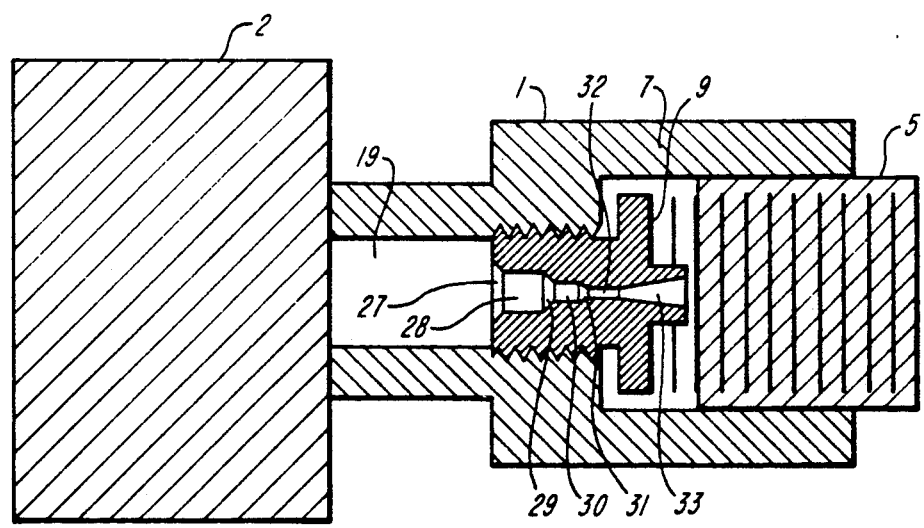
FIG. 1b illustrate flow through the installed device of FIG. 1a. The flow constriction device is shown in cross-section to show how flow characteristics to and through the nozzle are achieved through preferred embodiments.

FIG. 1b is an enlarged drawing from the outlet of the Y-strainer 2 to the outlet of the flow constriction device 1 of FIG. 1a. The view of the flow constriction device 1 is shown as a cut away in order to demonstrate design embodiments of the flow channel through the body of the device and into and through the changeable nozzle.

In accordance with the present invention, the design of the nozzle 9 takes advantage of the turbulence provided by that staging of the converging part of the nozzle and the greatly reduced turbulence achieved by the gradual tapering of the diverging section. The reasoning behind this design is as follows: Condensate within a piping system or equipment is formed on a continuous basis governed by the rate of heat transfer through the surface area contacting the steam. The condensate flows towards and along the lowest point in the piping system due simply to the force of gravity. Steam traps are connected at low points to collect and remove this condensate before it backs up into the steam lines or equipment, as shown in FIG. 1a. A properly sized flow constriction device will entirely remove this steady stream of condensate as it forms. The condensate flows along the bottom of the piping system drawn by the faster moving steam above and usually following a gradual pitch towards collection areas such as the mud leg 6. When the formed stream of condensate is removed continuously and completely, no back-up occures, and a steady stream continues to flow into the condensate return line 5 from the mud leg 6 and into the Y-strainer 2. This steady stream enters the body 7 of the flow constriction device and continues along the flow channel 19 in the body and into the nozzle flow channel 9a.

Figure 6:
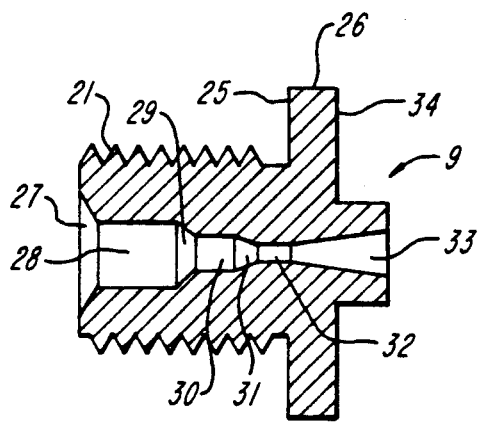
FIG. 6 is a cross-sectional view of the changeable nozzle piece.

The nozzle flow channel 9a is designed with two stages of decreasing diameter 28 and 30 joined to steep conical formations 27, 29 and 31, (see FIG. 6). The staging of the convergent inlet section promotes turbulence. The lower stream of condensate is forced into a wave that is pushed up into the path of the faster moving live steam and mixes with the live steam as a mist. By using a turbulence enhancing design to mix the stream of condensate with live steam, a steady slurry of denser condensate and live steam is delivered into the throat 32 of the nozzle. This slurry of steam and condensate at the saturation temperature of the higher upstream pressure flashes as its pressure drops while acclerating through the nozzle throat 32. Thus, a steady choke flow is maintained through the throat of the nozzle 9. This design requires that the nozzle be horizontally mounted or have a downward pitch. Once the mixture is in the throat 32 of the nozzle 9, the flow capacity of the nozzle is maximized by minimizing the turbulence through the diffusion stage 33 of the channel 9a. Minimum turbulence is attained by a gradual outward taper of the diverging stage 33 to control the expansion of the mixture as it adjusts to the lower downstream pressure.

The venturi-like nozzle channel 9a is composed of a stepped converging stage which includes a steeply tapered frustoconical formation 27, about 60°, leading to three coaxial cylindrical formations 28, 30 and 32 in order of reducing diameters with reference to the flow direction and joined to each other by steeply tapered frustoconical formations 29 and 31, also about 60°. The last and smallest of the cylindrical formations 32 is the throat of the nozzle. The diameter and length of the cylindrical formations 28, 30 and 32 are determined by the pressure differential across the nozzle and the amount of condensate which must be removed by it. The throat 32 leads to the slightly tapered diverging stage 33 which is composed of a frustoconical formation of slight taper, about 5°, whose length is a factor of the diameter of the throat 32.

Only the prior art device shown in U.S. Pat. Nos. 4,426,213 and 4,486,208 has a removably inserted nozzle. However, when changing the nozzle in that device, it is necessary to first remove the device from the piping system and then remove the in-line screen to gain access to the nozzle piece. The nozzle is frictionally mounted inside a bore in the body piece, and a reliable seal may not be attained upon reinserting a different nozzle. In contrast to that arrangement, the present invention allows access to the nozzle piece 9 through the outlet end of the assembly. Access to the nozzle piece is gained simply by disconnecting the outlet condensate return line connection to the device. The nozzle can be removed easily with a hex socket wrench. A sure seal is attained through existing thread sealing means or by use of the optional gasket piece 12.

Figure 4:
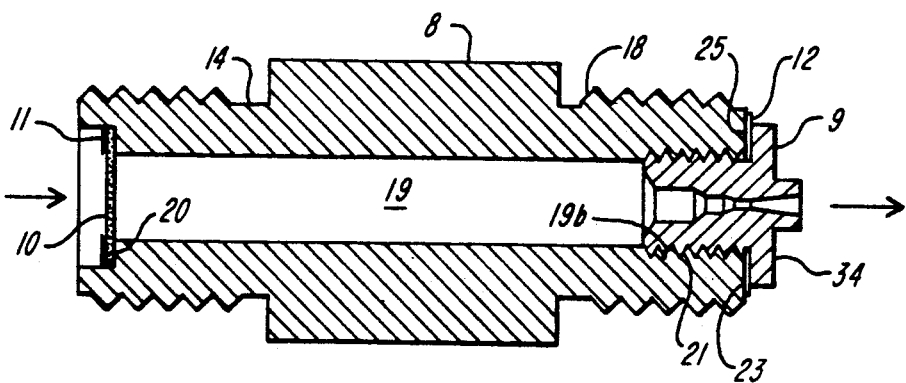
FIG. 4 is a cross-sectional view of an embodiment of the flow constriction assembly with male pipe connections at both ends.
Figure 5:
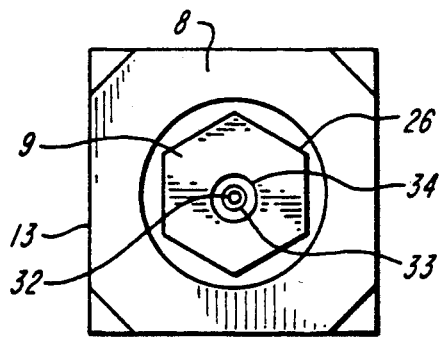
FIG. 5 is an end view of the outlet end of the flow constriction assembly shown in FIG. 4.

FIGS. 1b, 2, 3, 4 and 5 described below illustrate preferred embodiments which are used to attain a more reliable method of changing the nozzle piece 9 when required to meet changes in system conditions. The flow constriction device 1 of this invention is assembled from four pieces as in the embodiment of FIG. 2, or from five pieces, as in the embodiment of FIG. 4. These include the body piece 7 (FIG. 2) or 8 (FIG. 4), the nozzle piece 9, the screen 10, the screen retaining ring 11, and the optional gasket piece 12 (FIG. 4). In most installations, the optional gasket piece 12 will not be required as tapered pipe threads sealed with the proper thread sealing means will provide the necessary seal between the body piece 7 or 8 and the nozzle 9. The optional gasket piece 12 can be used in either the male/female or male/male embodiments of the device shown in FIGS. 2 and 4, respectively. Each of the body pieces a shown in FIGS. 2, 3 and 4, 5 includes means for attaching the device within a piping system, means for accepting a screening device at the entrance and means for accepting interchangeable nozzle structure without disturbing the inplace screening element.

The body 7 of the flow constriction device is fabricated from a solid piece of bar stock in the shape of a polygon such as square bar stock or hexagonal bar stock. This configuration is chosen to make the device stand out from the piping to which it is connected, to allow for large wrench engagement surfaces at appropriate intervals for easy wrench engagement, and to make it more readily identifiable as a trapping device. The drawings show body pieces fabricated from square bar stock 13. The body 7 may also be cast using an appropriate alloy if such a choice was desired for any reason.

The inlet end of the body is milled down to an appropriate diameter and an appropriate depth 14 for male pipe threads 14a. This formation facilitates installation of the device into the outlet end of a Y-strainer 2 as shown in FIG. 1a.

The outlet end of the body 7 has a flush cut-off 15 from the bar stock. A central bore 16 is cut into the body, coaxial with the male inlet formation 14. This bore 16 is cut to the appropriate diameter and depth to receive female pipe threads 17 subsequently formed in the outlet end. They provide a simple means of attaching pipe or pipe fittings to the outlet end of the device.

The body piece ca also be fabricated with male connections at both the inlet and outlet ends. FIG. 4 shows such a device. This is for convenience of installation. The flow channel 19 and interchangeable nozzle 9 are the same in both the male/female and male/male embodiments of the device. Socket weld formations can replace the pipe thread formations 14a and 17 when this is more convenient for installation.

Referring again to FIGS. 2 and 4, the body pieces 7 and 8 include a central cylindrical bore 19 through the device which is coaxial with the inlet and outlet and serves as a flow channel through the device. The diameter of the bore 19 must be small enough to allow for the milling of a suitable shoulder 20 at the inlet and to allow for the dimensioning of a nozzle piece 9 without affecting the threaded or socket-weld connections. Female threads 19a are cut into outlet end of the bore 19 to engage the male threads 21 of the nozzle 9 piece. These threads allow for a reliable sealing of mating surfaces. As mentioned above, a shoulder 20 is milled at the entrance of the central bore 19 at a diameter greater than that of the central bore 19. The depth of the shoulder 20 may be about 3/16 inch. The purpose is to provide a mounting surface for the circular screen element 10 and retaining ring 11. When the female formation is used at the outlet end of the body as in FIG. 2, the outlet of the central cylindrical bore 19 includes the female threads 19a to engage the nozzle piece 9 and also leads to the coaxial, larger diameter bore 16 of a dimension suitable for cutting the female pipe threads 17 or socket-weld formation. A shoulder 22 is milled at the deepest part of the bore 16 to about ¼ inch beyond the end of the female threads or socket weld formation to serve as a mating surface for the optional gasket 12. This larger diameter bore 16 must be of sufficient diameter to allow access to a tool used to insert the threaded nozzle piece 9. A sufficient gap is left between the corners of the nozzle's hexagonal perimeter and the walls of the bore 16 to provide access for the hex socket installation tool. When the option of a male formation 18 as in FIG. 4 is used at the outlet end of the body the central bore 19 extends through the body and includes the female threading 19b at its end to engage the nozzle piece 9. The end of the bar stock between the central bore 19 and the outer diameter of the outlet thread formation 18 serves as the shoulder seat 23 for the optional gasket 12.

Figure 2:
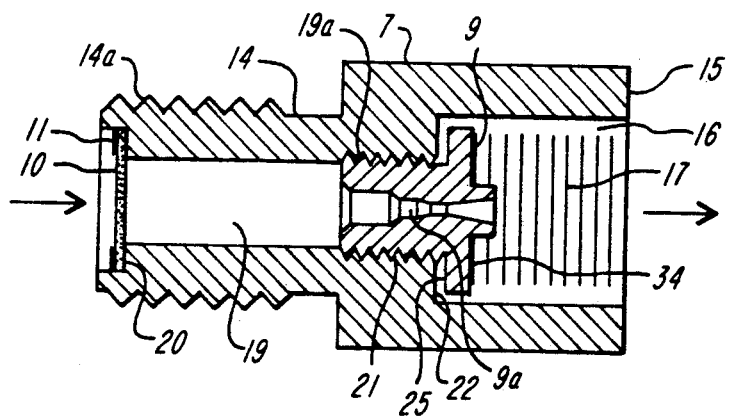
FIG. 2 is a cross-sectional view of the flow constriction assembly shown in FIG. 1b.
Figure 3:
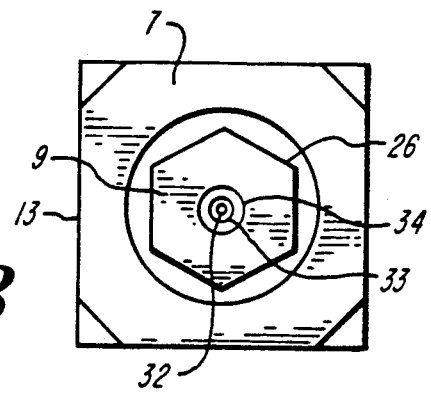
FIG. 3 is an end view from the outlet end of the flow constriction assembly shown in FIG. 2.
Figure 7:
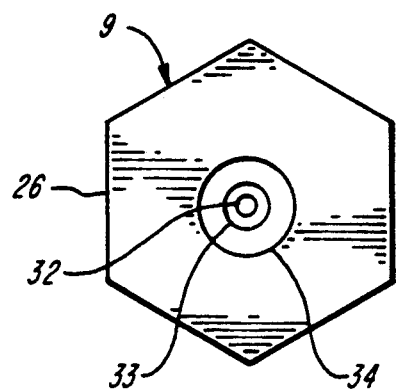
FIG. 7 is an end view of the changeable nozzle piece from the outlet end.

As shown in FIGS. 6 and 7, the nozzle piece 9 is fabricated from a piece hexagonal bar stock. The hexagonal perimeter 26 provides surfaces for engagement by a hex socket used to install the nozzle. Part of the hexagonal perimeter 26 is cut away for the cutting of male threads 21 to engage the female threads 19a or 19b at the end of the central bore 19 of the body piece. The male threads 21 are cut at the inlet end of the nozzle. A portion of this outer perimeter beyond the male threads is cut away to provide a mating shoulder formation 25 to match that of the seats 22 or 23 as shown in FIGS. 2 and 4. This shoulder formation may engage the optional gasket piece 12 when used. A shoulder 34 is also milled at the outlet end of the nozzle 9 as a means of having the nozzle exit formation project slightly into either the female thread bore as in FIG. 2 or mating pipe connection of the male/male embodiment of the device.

The screening structure 10 is composed of a single, corrosive resistant wire mesh of suitable gage to catch sediment that could block the throat of the nozzle 32. It is held in place by the frictionally mounted retaining ring 11. The screen 10 and retaining ring 11 are mounted at the shoulder 20 milled at the entrance to the body piece 7 or 8. The screen provides secondary protection for the nozzle 9 from particles carried in the condensate stream. The screen age is dictated by the size of the throat diameter of the nozzle 32. Larger diameter nozzles allow for larger gage screening. The placement of the screening device 10 allows for changing of, or service to, the nozzle piece 9 without disturbing the screen 10, as is evident in FIGS. 1b, 2 and 4.

The optional gasket 12 is used when straight threads 19a or 19b are used to engage the nozzle 9 to the body piece 7 or 8 as opposed to tapered threads. The tapered threads when sealed with a proper thread sealing compound will supply a leak proof seal in all but extremely high pressures. However, some temperature/pressue conditions may dictate use of a gasket 12 to provide proper sealing between the nozzle 9 and the body 7 or 8.

Having described this invention in detail, those skilled in the art will appreciate that modifications may be made of the invention without departing from its spirit. Therefore, it is not intended that the scope of the invention be limited to the specific embodiments illustrated and described. Rather its scope is to be determined by the appended claims and their equivalents.

I claim:

1. A flow constriction device for the extraction of condensate from a steam and compressed air line into a condensate line, the device comprising:
   an outer body having an inlet bore with a first diameter and an outlet bore with a second diameter greater than the first diameter, the inlet bore meeting the outlet bore at a shoulder inside the outer body and the inlet bore being internally threaded adjacent to the shoulder;
   means for connecting the steam and compressed air line to the inlet bore;
   means for connecting the condensate line to the outlet bore;
   a filter screen mounted in said inlet bore;
   a nozzle having a flat head and an externally-threaded cylindrical body having a turbulence producing inlet portion with a third diameter, a cylindrical venturi channel having a fourth diameter less than the third diameter and a turbulence-reducing outlet portion having a fifth diameter greater than the fourth diameter, the nozzle head being shaped so that it can be engaged by a wrench inserted through the outlet bore passage so that the nozzle body can be threaded into the inlet bore to draw the head against the shoulder.

2. A flow construction device according to claim 1 wherein the outer body has an inlet end and an outlet end and the outer body inlet end is externally-threaded and the outlet bore is internally-threaded at the outer body outlet end.

3. A flow constriction device according to claim 1 wherein the means for connecting the steam and compressed air line to the inlet bore comprises a Y-strainer having an inlet connected to the steam and compressed air line and an outlet connected to the outer body.

4. A flow constriction device as defined in claim 1 wherein
   the inlet portion is composed of a plurality of cylindrical sections joined by sharply converging frustoconical sections.

5. A flow constriction device as defined in claim 4 wherein
   the inlet portion is composed of a plurality of cylindrical sections joined by sharply converging frustoconical sections.

6. A flow constriction device for the extraction of condensate from a steam and compressed air line into a condensate line, the device comprising:
   an outer body having an inlet end and an outlet end and having a bore therethrough, the bore being internally-threaded adjacent the outlet end of the outer body;
   means for connecting the steam and compressed air line to the bore at the inlet end of the outer body;
   means for connecting the condensate line to the bore at the outlet end of the outer body;
   a filter screen mounted in said bore adjacent the outer body inlet end;
   a nozzle having a flat head and an externally-threaded cylindrical body having a turbulence producing inlet portion with a third diameter, a cylindrical venturi channel having a fourth diameter less than the third diameter and a turbulence-reducing outlet portion having a fifth diameter greater than the fourth diameter, the nozzle head being shaped so that it can be engaged by a wrench so that the nozzle body can be threaded into the bore at the outer body outlet end to draw the head against the outer body outlet end.

7. A flow constriction device according to claim 6 wherein the outer body has an inlet end and an outlet end and the outer body inlet end is externally-threaded and the outer body outlet end is externally threaded.

8. A flow constriction device according to claim 6 wherein the means for connecting the steam and compressed air line to the inlet bore comprises a Y-strainer having an inlet connected to the steam and compressed air line and an outlet connected to the outer body.

* * * * *